(12) United States Patent
Kondo

(10) Patent No.: US 6,891,649 B1
(45) Date of Patent: May 10, 2005

(54) METHOD OF AND APPARATUS FOR GENERATING COLOR CONVERSION TABLE AND APPARATUS FOR GENERATING PROOF USING COLOR CONVERSION TABLE

(75) Inventor: Hirokazu Kondo, Minamiashigara (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 993 days.

(21) Appl. No.: 09/625,348

(22) Filed: Jul. 25, 2000

(30) Foreign Application Priority Data

Jul. 28, 1999 (JP) .......................................... 11-213485

(51) Int. Cl.⁷ .............................................. G03F 3/10
(52) U.S. Cl. ..................... 358/527; 358/1.9; 358/518; 358/520; 358/527; 358/529
(58) Field of Search .................... 358/1.9, 518, 520, 358/527, 529

(56) References Cited

U.S. PATENT DOCUMENTS

| | | | |
|---|---|---|---|
| 4,500,919 A | * | 2/1985 | Schreiber .................... 358/518 |
| 4,926,254 A | * | 5/1990 | Nakatsuka et al. ......... 358/527 |
| 5,077,604 A | * | 12/1991 | Kivolowitz et al. ........ 358/520 |
| 5,572,632 A | * | 11/1996 | Laumeyer et al. ......... 358/1.17 |
| 5,583,666 A | * | 12/1996 | Ellson et al. ................ 358/518 |
| 5,774,238 A | * | 6/1998 | Tsukada ...................... 358/529 |
| 5,835,244 A | * | 11/1998 | Bestmann ................... 358/523 |
| 6,026,216 A | * | 2/2000 | Ohtsuka et al. ............. 358/1.9 |
| 6,331,899 B1 | * | 12/2001 | Samadani .................... 358/1.9 |
| 6,341,175 B1 | * | 1/2002 | Usami ........................ 382/167 |
| 6,396,595 B1 | * | 5/2002 | Shimazaki .................. 358/1.9 |
| 6,411,318 B1 | * | 6/2002 | Sawano et al. ............. 347/188 |

* cited by examiner

Primary Examiner—Mark Wallerson
Assistant Examiner—Michael Burleson
(74) Attorney, Agent, or Firm—Sughrue Mion, PLLC (57) ABSTRACT

For converting color data to be processed by a first device into color data to be processed by a second device, using a color conversion table, a constraint condition is set between the color data, and a color conversion table between at least portions of the color data is generated according to the constraint conditions, whereas a color conversion table between remainders of the color data is generated in calorimetric association therewith.

20 Claims, 8 Drawing Sheets

| COLOR MIXING PREVENTION | | |
|---|---|---|
| SAVE PRIMARY COLORS | C☐ M☐ Y☑ K☐ | |
| SAVE SECONDARY COLORS | R☑ G☑ B☐ | |

☑ SAVE PRIMARY COLORS, SECONDARY COLORS

INDICATION OF PRIMARY COLOR
HALFTONE % GRADATION

|   | HL | SH |
|---|---|---|
| C | ☑ 0 - [0] | ☑ [100] - 100 |
| M | ☑ 0 - [0] | ☑ [100] - 100 |
| Y | ☑ 0 - [0] | ☑ [100] - 100 |
| K | ☑ 0 - [0] | ☑ [100] - 100 |

METHOD OF AND APPARATUS FOR GENERATING COLOR CONVERSION TABLE AND APPARATUS FOR GENERATING PROOF USING COLOR CONVERSION TABLE

BACKGROUND OF THE INVENTION

1. Field of the Invention

The present invention relates to a method of and an apparatus for generating a color conversion table which converts color data to be processed by a first device into color data to be processed by a second device, and an apparatus for generating a proof using such a color conversion table.

2. Description of the Related Art

In order to produce desired printed materials of color images, it is necessary to take into account various printing conditions including the type of inks used, the printing sheets used, the illumination with which to observe the printed materials, etc. Desired printing conditions could be established by actually printing color images under various possible printing conditions. However, it would be unrealistic to produce test prints under all combinations of possible printing conditions because such test prints would incur an unduly expenditure of time and money.

There has been developed a printing proof generating apparatus capable of easily simulating the finished state of a printed material without actually producing the printed material. The printing proof generating apparatus operates by converting image data to be printed under various printing conditions to generate device-independent colorimetric data of colors expected of the final printed material, thereafter converting the calorimetric data into proof image data taking into account the characteristics of the printing proof generating apparatus, and then generating a proof based on the proof image data.

Since printing conditions can freely be established using a conversion table which converts image data into colorimetric data, it is possible to generate a proof easily and inexpensively and then to determine printing conditions under which to produce the desired printed material from the generated proof.

All colors of a color printed material can theoretically be produced from three colors of C (cyan), M (magenta), and Y (yellow). However, inks of these three colors may not necessarily have ideal spectral characteristics. In order to eliminate such a drawback, color printed materials are usually produced using inks of four colors which include the above three colors and an additional color of K (black). The printing proof generating apparatus also uses such four colors of C, M, Y, K for producing more accurate proofs.

A printed material and a proof thereof may colorimetrically be equivalent to each other, but may not necessarily be in sufficient agreement to the eye of an observer. Most typically, when a printed material composed of halftone dots is formed using only an ink of K, if a proof thereof is produced using a combination of inks of C, M, Y that are colorimetrically equivalent to the printed material, then the proof may possibly appear appreciably different from the printed material to the observer when observed microscopically. According to another example, while a printed material is formed using an ink of Y, a proof thereof may contain an ink of M in addition to the ink of Y. In addition, a printed material and a proof thereof, though colorimetrically equivalent to each other, may possibly be observed differently from each other if their halftone dot area percentages differ from each other. Such discrepancies manifest themselves in highlights and shadows of the image. The same problem arises if the dot gains of the printed material and the proof differ from each other.

SUMMARY OF THE INVENTION

It is a general object of the present invention to provide a method of and an apparatus for generating a color conversion table which is capable of converting desired color data to be processed by a first device into color data to be processed by a second device while constraining the desired color data.

A major object of the present invention to provide an apparatus for generating a proof which agrees with evaluations and does not make the observer feel discrepancies when a proof of an image to be generated by a first device is produced by a second device and evaluated.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

According to the present invention, if constraint conditions are established to constrain the conversion relationship of particular primary color data or secondary color data selected from the colors of C, M, Y, K, then when image data to be processed by a first device comprises only the particular primary color data or secondary color data, the image data to be processed by the first device is converted into image data to be processed by a second device such that the image data to be processed by the second device comprises only the particular primary color data or secondary color data. By converting the image data to be processed by the first device into the image data to be processed by the second device using a color conversion table set based on the above constraint conditions and thereafter generating a proof with a printer or the like as the second device, the observer can compare and evaluate an image generated by the first device and the proof generated by the second device with the selected particular primary color data or secondary color data without feeling appreciable discrepancies therebetween.

If constraint conditions are established to save the halftone dot area percentage of a particular range of color data, then the halftone dot area percentage of an image generated by a first device and the halftone dot area percentage of a proof generated by a second device can be equalized to each other in the particular range, allowing the observer to compare and evaluate the image and the proof without feeling appreciable discrepancies therebetween. The constraint conditions to save the halftone dot area percentage of the particular range can be established for each particular color data. Furthermore, by establishing a junction range between the above particular range and another range as a constraint condition, the halftone dot area percentages of the image generated by the first device and the proof generated by the second device can be equalized to each other in the particular range, a colorimetrically corresponding proof can be generated using a color conversion table in the other range, and a proof in which halftone dot area percentages are made continuous without discrepancies can be generated in the junction range.

If constraint conditions are established in order to save a dot gain of color data, an image generated by a first device and a proof generated by a second device can be compared and evaluated with equalized dot gains.

Figure 1:
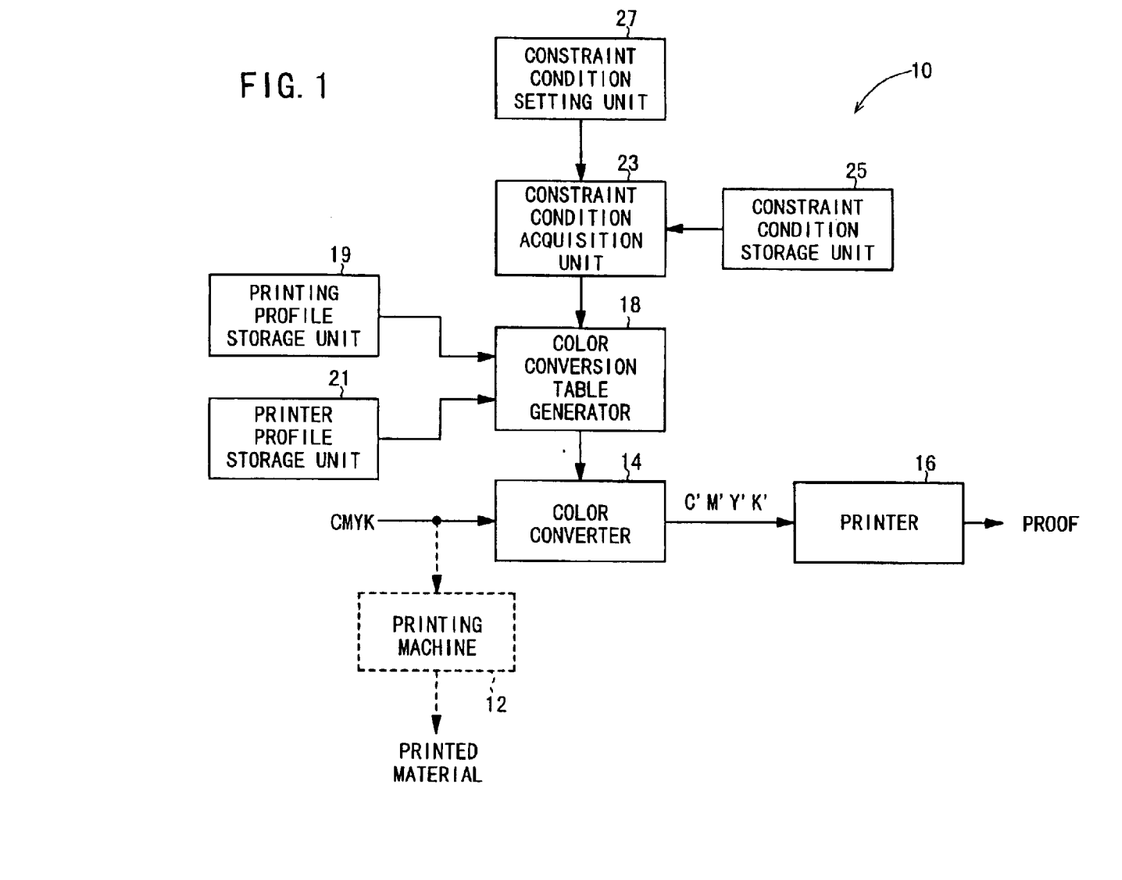
FIG. 1 is a block diagram of a printing proof generating apparatus which incorporates a method of and an apparatus for generating a color conversion table and an apparatus for generating a proof according to the present invention.

FIG. 1 shown in block form of an overall arrangement of a printing proof generating apparatus 10 according to the present invention.

The printing proof generating apparatus 10 is an apparatus for generating, for evaluation, a proof of a printed material, which is to be produced by a printing machine 12 (first device) based on printing image data C, M, Y, K as separated into four colors of C (cyan), M (magenta), Y (yellow), and K (black), with a printer 16 (second device or proof output means). The printing proof generating apparatus 10 has a color converter 14 (color converting means) having a color conversion table for converting color data D comprising the printing image data C, M, Y. K into color data D' comprising proof image data C', M', Y', K' of corresponding four colors.

The printing proof generating apparatus 10 also has a color conversion table generator 18 (color conversion table generating means) for generating the color conversion table of the color converter 14. To the color conversion table generator 18, there are connected a printing profile storage unit 19 (first profile storage unit) for storing a printing profile established depending on printing conditions for the printed material to be generated by the printing machine 12, and a printer profile storage unit 21 (second profile storage unit) for storing a printer profile established depending on output conditions for the proof to be generated by the printer 16. The printing profile storage unit 19 and the printer profile storage unit 21 jointly serve as a color conversion table storage means.

The printing conditions are conditions including the type of inks used, the printing sheets used, the printing pressure applied upon printing, and the inherent characteristics of the printing machine 12, etc. A plurality of printing profiles are established depending on combinations of those printing conditions. The output conditions are conditions including the types of inks used for printout, printing sheets used for printout and the inherent characteristics of the printer 16, etc. A plurality of printer profiles are established depending on combinations of those output conditions.

To the color conversion table generator 18, there is also connected a constraint condition acquisition unit 23 for acquiring constraint conditions to be added in the generation of a color conversion table. The constraint condition acquisition unit 23 acquires constraint conditions which have been established and stored in a constraint condition storage unit 25 (constraint condition storage means) or constraint conditions which are established by the operator using a constraint condition setting unit 27, and supplies the selected constraint conditions to the color conversion table generator 18. Alternatively, the constraint condition acquisition unit 23 (constraint condition selecting means) may select desired constraint conditions from the constraint condition storage unit 25 based on information entered by the operator using the constraint condition setting unit 27, and supply the selected constraint conditions to the color conversion table generator 18.

The constraint condition acquisition unit 23, the constraint condition storage unit 25, and the constraint condition setting unit 27 jointly make up a constraint condition setting means. The constraint condition setting means, the color conversion table generator 18, printing profile storage unit 19, and the printer profile storage unit 21 make up an apparatus for generating a color conversion table according to the present invention.

The printing proof generating apparatus 10 is basically constructed as described above. A method of generating a color conversion table in the printing proof generating apparatus 10 will be described below.

Figure 2:
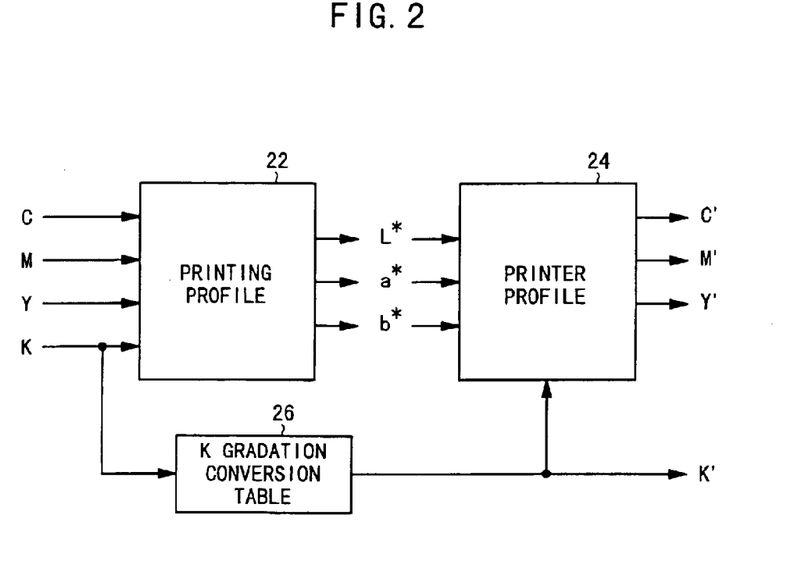
FIG. 2 is a block diagram illustrative of the method of generating a color conversion table.

First, a process of generating a basic color conversion table prior to the setting of constraint conditions will be described below with reference to FIGS. 2 and 3.

The basic color conversion table is generated by combining the printing profile 22 stored in the printing profile storage unit 19, the printer profile 24 stored in the printer profile storage unit 21, and a K gradation conversion table 26.

The printing profile 22 is a conversion table for converting color data D composed of printing image data C, M, Y, K into colorimetric data L*, a*, b* in the CIE colormetric system which are device-independent image data. The printing profile 22 can be determined as follows: First, a printed material is produced under given printing conditions by the printing machine 12 from printing image data C, M, Y, K, and then colorimetric data L*, a*, b* of the printed material are colorimetrically determined. The printing profile 22 is determined as a relationship between the printing image data C, M, Y, K and the colorimetric data L*, a*, b*, for conversion from the printing image data C, M, Y. K into the colorimetric data L*, a*, b*.

The printer profile 24 is a conversion table for converting the colorimetric data L*, a*, b* into color data D' comprising proof image data C', M', Y', K' depending on the output characteristics of the printer 16. The printer profile 24 is established depending on the output characteristics of the printer 16, and can be determined according to a process of generating a printer profile as shown in FIG. 3.

Figure 3:
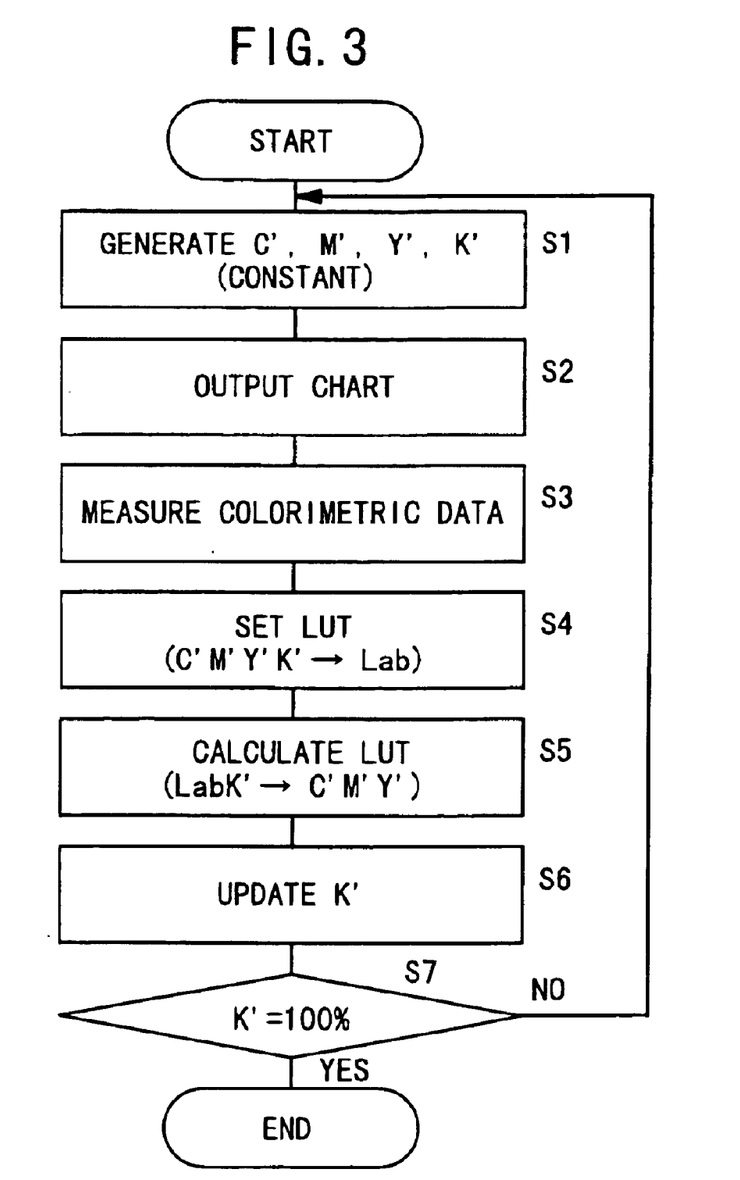
FIG. 3 is a flowchart of a process of generating a printer profile shown in FIG. 2.

The process of generating a printer profile as shown in FIG. 3 will be described below. First, a plurality of proof image data C', M', Y', K' including the proof image data K' at an area percentage of 0% and the remaining proof image data C', M', Y' at area percentages in increments of 10% are generated in step S1. Using the proof image data C', M', Y', K', a chart comprising a plurality of patches is generated by the printer 16 in step S2. Then, the colorimetric data L*, a*, b* of the patches are measured with a calorimeter in step S3. Then, a forward conversion table LUT ((C'M'Y'K'→Lab) for converting the proof image data C', M', Y', K' (0%) into the colorimetric data L*, a*, b* is determined in step S4.

Using the forward conversion table LUT (C'M'Y'K' Lab), a reverse conversion table LUT (LabK'→C'M'Y') for converting calorimetric data L*, a*, b* with respect to the proof image data K' (0%) into proof image data C', M', Y' is determined in step S5. The reverse conversion table LUT (LabK'→C'M'Y') can be determined using the Newtonian method which is a typical successive approximation method.

Then, the proof image data K' is updated in incremental area percentages of 10%, 20%, 100% in step S6. Then, the processing in steps S1 through S5 is repeated to determine reverse conversion tables LUT (LabK'→C'M'Y') for converting calorimetric data L*, a*, b* with respect to the constant proof image data K' into proof image data C', M', Y'in step S7.

A plurality of reverse conversion tables LUT (LabK'→C'M'Y') thus determined are stored as the printer profile 24 in the printer profile storage unit 21.

The K gradation conversion table 26 serves to convert the gradation of printing image data K depending on the output characteristics of the printer 16 to generate the proof image data K'. The K gradation conversion table 26 is established such that the calorimetric value of a printed material composed of only the printing image data K is equalized to the calorimetric value of a proof composed of only the proof image data K'.

The color conversion table generator 18 combines the printing profile 22, the printer profile 24, and the K gradation conversion table 26 thus established, thereby generating a color conversion table with K saved for converting the color data D comprising the printing image data C, M, Y, K into the color data D' comprising the proof image data C', M', Y', K'.

The color conversion table generator 18 modifies the color conversion table thus generated depending on constraint conditions, thereby producing a new color conversion table.

Figure 4:
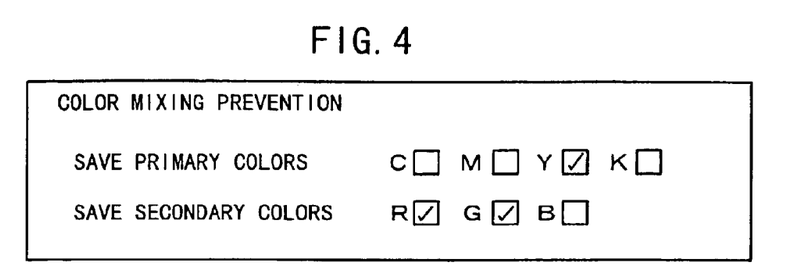
FIG. 4 is a view showing a displayed image for setting constraint conditions for color mixing prevention.

FIG. 4 shows a displayed image for setting constraint conditions for color mixing prevention. The displayed image allows the operator to set constraint conditions for constraining a conversion relationship of primary color data of C, M, Y, K or secondary color data of R. G, B. It is assumed that the operator has set constraint conditions for constraining primary color data of Y and secondary color data of R (=M+Y) and C (=C+Y), for example, using the constraint condition setting unit 27.

It is assumed that the color conversion table generated by combining the printing profile 22, the printer profile 24, and the K gradation conversion table 26 is represented by LUT (CMYK→C'M'Y'K'). The color conversion table generator 18 changes data of a color conversion table LUT (00Y0→C'M'Y'K') for converting printing image data Y with printing image data C=M=K=0 into the proof image data C', M', Y', K', to data LUT (00Y0→00Y'0) with proof image data C'=M'=K'=0, with respect to the constraint conditions for constraining the primary color data of Y as acquired by the constraint condition acquisition unit 23, and sets the changed data in the color converter 14.

Similarly, the color conversion table generator 18 changes a color conversion table LUT (0MY0→C'M'Y'K') and a color conversion table LUT (C0Y0→C'M'Y'K') to a color conversion LUT (0MY0→0M'Y'0) and a color conversion table LUT (C0Y0→C'0Y'0'0) with respect to the constraint conditions for constraining the secondary color data of R, G, and sets the changed color conversion tables in the color converter 14.

After the new color conversion tables with the constraint conditions set have been set in the color converter 14, arbitrary printing image data C. M. Y, K are converted into proof image data C', M', Y', K' by the color conversion tables with the constraint conditions, and the proof image data C', M', Y', K' are supplied to the printer 16. The printer 16 then generates a proof based on the supplied proof image data C', M', Y', K'.

If the printing image data C, M, Y, K comprise image data of Y only, image data of R only, or image data of G only, then the generated proof is free of mixed other colors. Even when the observer observes the proof at a magnified scale, therefore, the observer can evaluate the printing conditions without appreciable discrepancies because the colors of the proof are in agreement with the colors of the printed material.

A plurality of sets of constraint conditions may be stored in the constraint condition storage unit 25, and the constraint condition acquisition unit 23 may select a desired set of constraint conditions from the constraint condition storage unit 25 based on information entered by the operator using the constraint condition setting unit 27, and supply the selected constraint conditions to the color conversion table generator 18 for the generation of a color conversion table.

Figure 5:
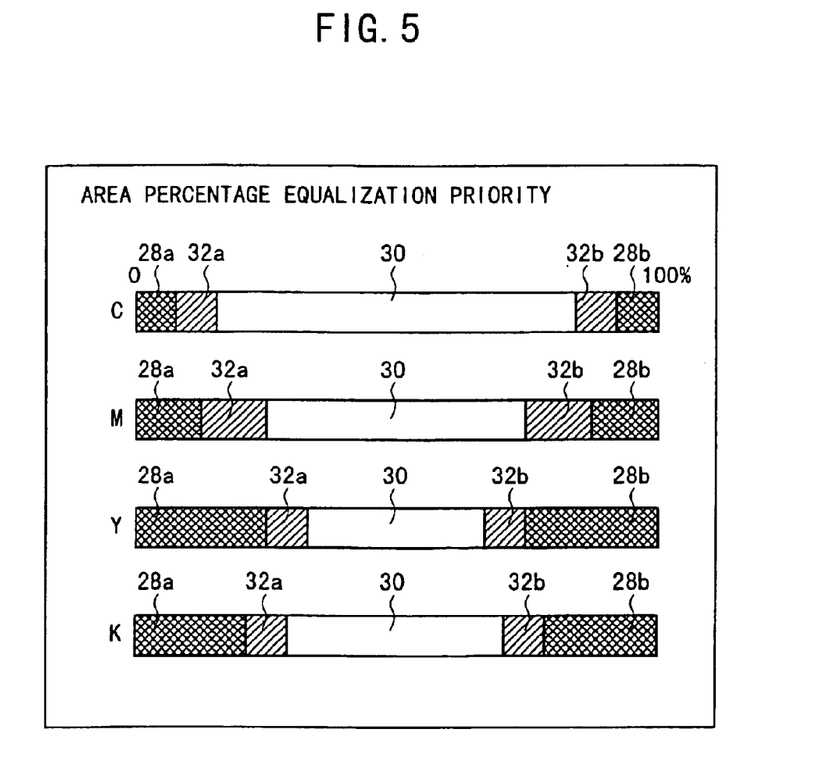
FIG. 5 is a diagram showing constraint conditions set for area percentage equalization priority.

FIG. 5 shows constraint conditions set for equalizing area percentages of an image in a particular range. As shown in FIG. 5, the operator can arbitrarily set area percentage equalized ranges 28a, 28b for equalizing area percentages, color equalized ranges 30 for equalizing colors without changing the basic color conversion table, and junction ranges 32a, 32b disposed between the area percentage equalized ranges 28a, 28b and the color equalized ranges 30 for making a gradual shift from the equalized area percentages toward the equalized colors, between the respective primary color data of the printing image data C, M, Y, K and the respective primary color data of the proof image data C', M', Y', K'. The area percentage equalized ranges 28a and the junction ranges 32a are ranges set in highlights of the image, and the area percentage equalized ranges 28b and the junction ranges 32b are ranges set in shadows (solid image areas) of the image.

The color conversion table generator 18 modifies the color conversion table LUT (CMYK→C'M'Y'K') in order for the printing image data C, M, Y, K to be equalized respectively to the proof image data C', M', Y', K', with respect to the area percentage equalized ranges 28a, 28b. The color conversion table generator 18 modifies the color conversion table LUT (CMYK→C'M'Y'K') by way of interpolation in order to make a gradual shift from the relationship in which the printing image data C, M, Y, K are equalized respectively to the proof image data C', M', Y', K' to the relationship of the color conversion table LUT (CMYK→C'M'Y'K') already set for the color equalization ranges 30, with respect to the junction ranges 32a, 32b. The color conversion table generator 18 holds the color conversion table LUT (CMYK→C'M'Y'K') as it is, with respect to the color equalization ranges 30. The color conversion table LUT (CMYK→C'M'Y'K') thus modified is set in the color converter 14.

Figure 6:
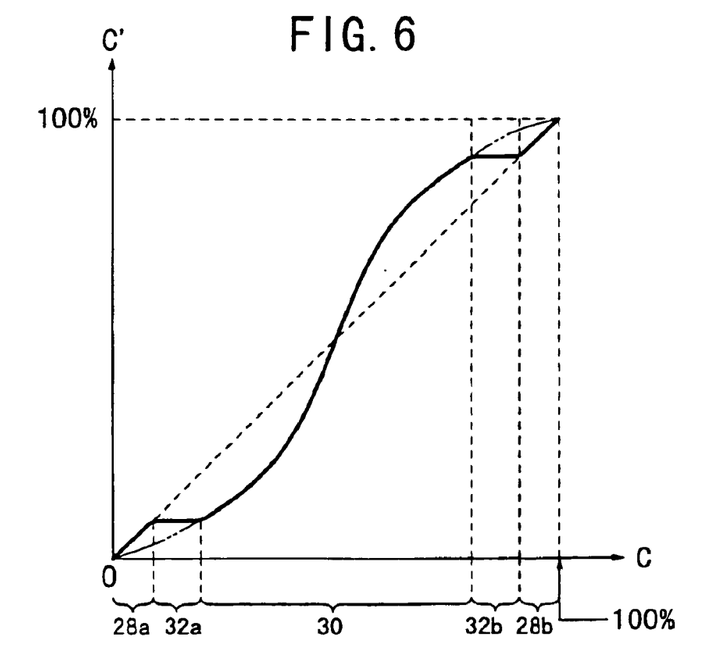
FIG. 6 is a diagram illustrative of a color conversion table modified according to the constraint conditions set for area percentage equalization priority.

In FIG. 6, the solid-line curve represents the color conversion table LUT (CMYK→C'M'Y'K') that is set in the color converter 14 for converting printing image data C into proof image data C'.

If arbitrary printing image data C, M, Y, K are converted into proof image data C', M', Y', K' using the color conversion table thus set and a proof is generated from the proof image data C', M', Y', K' by the printer 16, then in the area percentage equalized ranges 28a, 28b, since the area percentages of the printed material and the proof are equal to each other, the observer can compare and evaluate images without feeling discrepancies between the area percentages. Since a proof free of discrepancies can be obtained in the vicinity of highlights of the image which are greatly affected by area percentage variations, the observer can evaluate the proof more effectively.

The color conversion table generator 18 can further modify the color conversion table LUT (CMYK→C'M'Y'K') according to constraint conditions for equalizing dot gains between the printed material and the proof.

Figure 7:
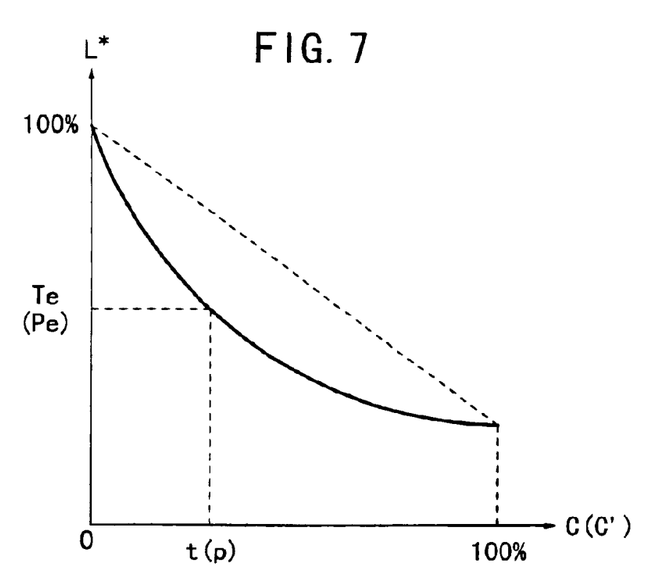
FIG. 7 is a diagram showing the relationship between image data and luminance in terms of dot gains.

Specifically, because of the effect of dot gains based on the characteristics of the proof sheet and inks, an input-to-output relationship represented by the solid-line curve in FIG. 7 exists between the printing image data C, M, Y, K (the proof image data C', M', Y', K') and the luminance L* of the printed material (the proof). In view of the above input-to-output relationship, the color conversion table generator 18 modifies the color conversion table LUT (CMYK→C'M'Y'K') for thereby reproducing the effect of dot gains on the proof for more accurate image evaluation.

More specifically, if it is assumed that the luminance of a printing sheet itself is represented by T0, the luminance of an ink recorded according to either one of the printing image data C, M, Y, K as a solid area (halftone dot 100%) on the printing sheet is represented by T1, and the luminance of the ink recorded at a halftone dot area percentage t is represented by Tt, then the effective halftone dot area percentage Te of the printed material is expressed by:

$$Te=(T0-Tt)/(T0-T1) \quad (1)$$

If it is assumed that the luminance of a proof sheet itself is represented by P0, the luminance of an ink recorded according to either one of the proof image data C', M', Y', K' which correspond to the printing image data C, M, Y, K as a solid area (halftone dot 100%) on the proof sheet is represented by P1, and the luminance of the ink recorded at a halftone dot area percentage p is represented by Pp, then the effective halftone dot area percentage Pe of the proof is expressed by:

$$Pe=(P0-Pt)/(P0-P1) \quad (2)$$

In order to equalize the effective halftone dot area percentage Te of the printed material and the effective halftone dot area percentage Pe of the proof to each other, the equations (1), (2) are equalized as follows:

$$p=P^{-1}\{P0-(T0-Tt)\cdot(P0-Pp)/(T0-T1)\} \quad (3)$$

for thereby determining the relationship between the halftone dot area percentage p of the proof and the halftone dot area percentage t of the printed material. In the equation (3), $p^{-1}$ indicates the inverse function of Pp.

If constraint conditions for saving the dot gain of particular primary color data are set, then a new color conversion table LUT (CMYK→C'M'Y'K') can be obtained by modifying the color conversion table LUT (CMYK→C'M'Y'K') with respect to the particular primary color data according to the equation (3).

Figure 8:
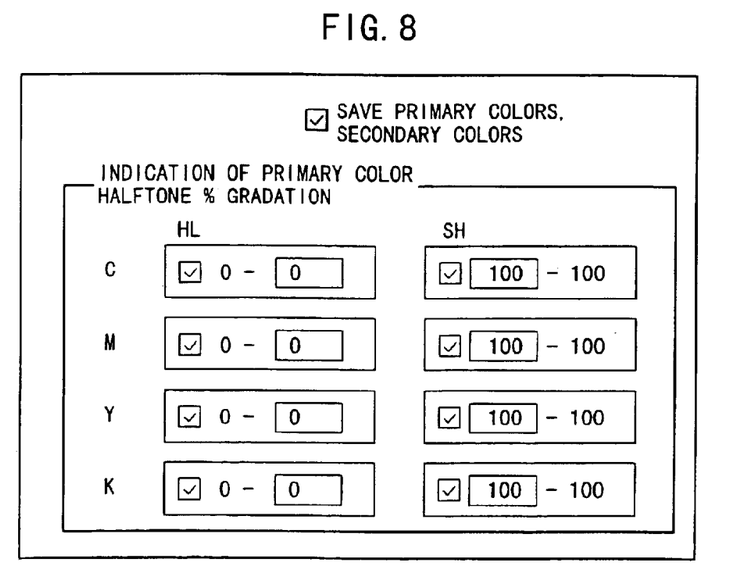
FIG. 8 is a view showing a displayed image for setting constraint conditions for color mixing prevention and area percentage equalization priority according to another embodiment of the present invention.

FIG. 8 shows a displayed image for setting constraint conditions according to another embodiment of the present invention. In the displayed image shown in FIG. 8, the operator can set a constraint condition as to whether primary color data and secondary color data are to be simultaneously constrained or not. If the constraint condition is set to simultaneously constrain primary color data and secondary color data, then all color data of C, M, Y, K, R, G, B are constrained before and after color data conversion.

In the displayed image shown in FIG. 8, the operator can also specify ranges in which halftone dot area percentages are to be equalized with respect to the respective primary color data of C, M, Y. K. In the example shown in FIG. 8, constraint conditions are set in which halftone dot area percentages are equalized in highlights (O %) and shadows (100%) of the primary color data.

In the above embodiment, after a color conversion table is generated while the relationship between printing image data K and proof image data K is being fixed, a new color conversion table with constraint conditions is generated according to constraint conditions. Therefore, an always constrained relationship is obtained with respect to K (black).

However, after a basic color conversion table is generated without K (black) being fixed, constraint conditions for color mixing prevention as shown in FIG. 4 may be set with respect to the printing image data C, M, Y, K including K (black). Constraint conditions for area percentage equalization priority as shown in FIG. 5 and constraint conditions for equalizing dot gains may similarly be set.

In the above embodiment, after the color conversion table generator 18 has generated a basic color conversion table prior to the setting of constraint conditions, the basic color conversion table is modified according to constraint conditions. However, a color conversion table may be generated with constraint conditions initially added thereto.

Although certain preferred embodiments of the present invention have been shown and described in detail, it should be understood that various changes and modifications may be made therein without departing from the scope of the appended claims.

What is claimed is:

1. A method of generating a color conversion table for converting first color data D to be processed by a first device into second color data D' to be processed by a second device, comprising the steps of:

determining a first calorimetric value of a first color obtained by processing the first color data D with the first device;

determining a second colorimetric value of a second color obtained by processing the second color data D' with the second device:

establishing a color conversion table such that said first colorimetric value is equalized to said second colorimetric value;

establishing a constraint condition to constrain color conversion relationships of said color conversion table between portions of said first and second color data D and D' after establishing the color conversion table; and modifying the color conversion table between portions of said first and second color data D and D' according to said constraint condition for generating a new color conversion table.

2. A method according to claim 1, wherein said constraint condition comprises a condition for constraining a relationship for converting color data of at least one primary color.

3. A method according to claim 1, wherein said constraint condition comprises a condition for constraining a relationship for converting color data of at least one secondary color.

4. A method according to claim 1, wherein said constraint condition comprises a condition for equalizing halftone dot area percentages of particular ranges in said portions of said first and second color data D and D'.

5. A method according to claim 4, wherein said particular range is established in at least one of a highlight area of said first and second color data D and D' and a shadow area of said first and second color data D and D'.

6. A method according to claim 4, wherein said constraint condition comprises a condition for equalizing the halftone dot area percentages of said particular ranges in said portions of said first and second color data D and D', and a condition for gradually shifting halftone dot area percentages of junction ranges between said particular ranges and other ranges from the halftone dot area percentage of said first color data D to the halftone dot area percentage of said second color data D'.

7. A method according to claim 6, wherein said condition for gradually shifting the halftone dot area percentages of the junction ranges comprises a condition for interpolating the halftone dot area percentages of said particular ranges and the halftone dot area percentages of the junction ranges.

8. A method according to claim 1, wherein said constraint condition comprises a condition for equalizing dot gains of said portions of said first and second color data D and D'.

9. An apparatus for generating a color conversion table for converting first color data D to be processed by a first device into second color data D' to be processed by a second device, comprising:

color conversion table establishing means for establishing a color conversion table such that a first colorimetric value of a first color is equalized to a second colorimetric value of a second color, said first colorimetric value being determined based on the first color obtained by processing the first color data D with the first device, said second calorimetric value being determined based on the second color obtained by processing the second color data D' with the second device;

constraint condition setting means for setting a constraint condition of conversion relationships of said color conversion table between portions of said first and second color data D and D'; and color conversion table modifying means for modifying said color conversion table between said portions of said first and second color data D and D' according to said constraint condition, and generating a new color conversion table.

10. An apparatus according to claim 9, wherein said constraint condition setting means comprises:

constraint condition storage means for storing constraint conditions; and constraint condition selecting means for selecting the constraint condition from said constraint condition storage means.

11. An apparatus according to claim 9, further comprising:

color conversion table storage means for storing a color conversion table in colorimetric association between said first and second color data D and D';

said color conversion table modifying means comprising means for modifying said color conversion table stored in said color conversion table storage means into a new color conversion table based on said constraint condition.

12. An apparatus according to claim 11, wherein said color conversion table storage means comprises:

a first profile storage unit for storing a first profile representing a conversion relationship between said first color data D and colorimetric data; and a second profile storage unit for storing a second profile representing a conversion relationship between said calorimetric data and said second color data D'.

13. An apparatus according to claim 12, wherein said first profile comprises a profile established depending on printing conditions of said first device, and said second profile comprises a profile established depending on output conditions of said second device.

14. An apparatus for generating a proof by converting image data composed of first color data D to be processed by a first device into image data composed of second color data D' to be processed by a second device, using a color conversion table, and generating a proof of an image produced by said first device with said second device, comprising:

color conversion table establishing means for establishing a color conversion table such that a first calorimetric value of a first color is equalized to a second calorimetric value of a second color, said first calorimetric value being determined based on the first color obtained by processing the first color data D with the first device, said second calorimetric value being determined based on the second color obtained by processing the second color data D' with the second device;

constraint condition setting means for setting a constraint condition of conversion relationships of said color conversion table between portions of said first and second color data D and D';

color conversion table modifying means for modifying said color conversion table between said first and second color data D and D' according to said constraint condition, and generating a new color conversion table;

color converting means for converting said first color data D into said second color data D' using said color conversion table generated by said color conversion table modifying means; and proof output means for outputting said proof based on said second color data D'.

15. An apparatus according to claim 14, wherein said constraint condition setting means comprises:

constraint condition storage means for storing constraint conditions; and constraint condition selecting means for selecting the constraint condition from said constraint condition storage means.

16. An apparatus according to claim 14, further comprising:

color conversion table storage means for storing a color conversion table in colorimetric association between said first color data D and said second color data D';

said color conversion table modifying means comprising means for modifying said color conversion table stored in said color conversion table storage means into a new color conversion table based on said constraint condition.

17. An apparatus according to claim 14, wherein said proof output means comprises a printer.

18. A method according to claim 1, wherein said constraint condition is set independently of said output characteristics and printing conditions of the first and second devices.

19. An apparatus according to claim 9, wherein said constraint condition setting means sets said constraint condition independently of said output characteristics and printing conditions of the first and second devices.

20. An apparatus according to claim 14, wherein said constraint condition setting means sets said constraint condition independently of said output characteristics and printing conditions of the first and second devices.

* * * * *